May 7, 1963 H. GONG ET AL 3,089,108
SEMICONDUCTOR STRAIN GAUGE
Original Filed Oct. 3, 1960 3 Sheets-Sheet 1

HOWARD GONG,
JOSEPH C. SANCHEZ,
ROBERT E. TALMO,
INVENTORS.

BY THEIR ATTORNEYS.

Spensley & Horn.

May 7, 1963 H. GONG ET AL 3,089,108
SEMICONDUCTOR STRAIN GAUGE
Original Filed Oct. 3, 1960 3 Sheets-Sheet 2
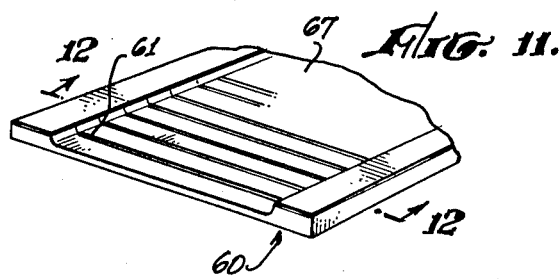
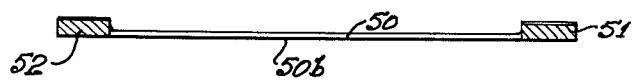
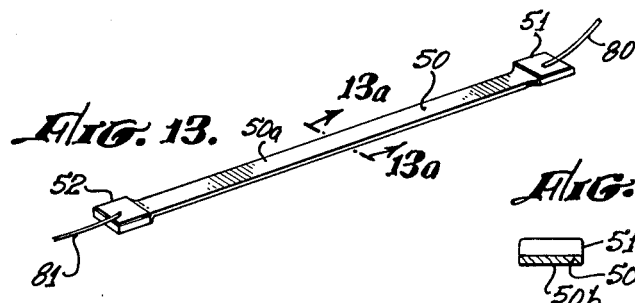
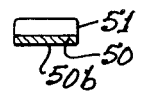
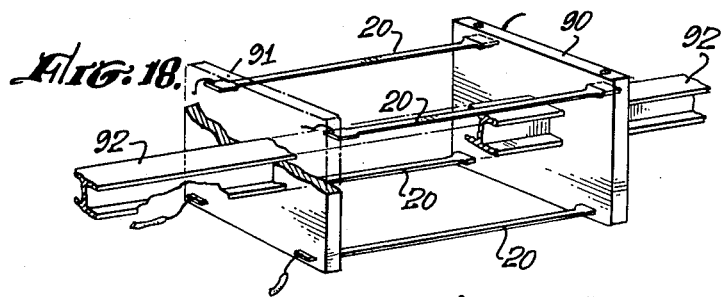
HOWARD GONG,
JOSEPH C. SANCHEZ,
ROBERT E. TALMO,
INVENTORS.
BY THEIR ATTORNEYS.
Spensley & Horn.

May 7, 1963  H. GONG ET AL  3,089,108
SEMICONDUCTOR STRAIN GAUGE
Original Filed Oct. 3, 1960  3 Sheets-Sheet 3
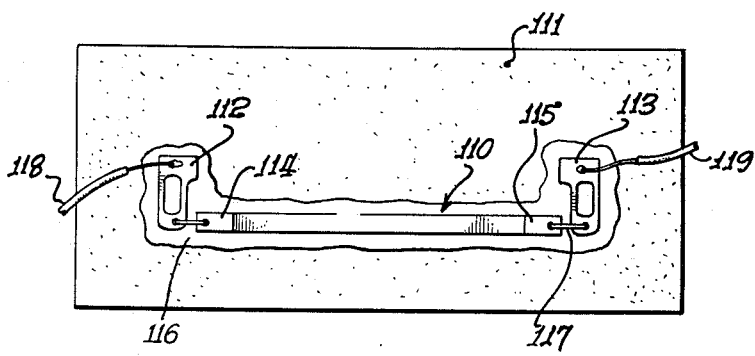
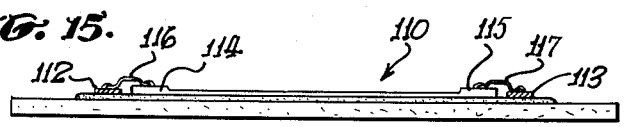
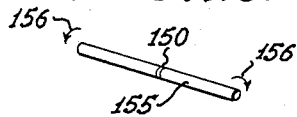
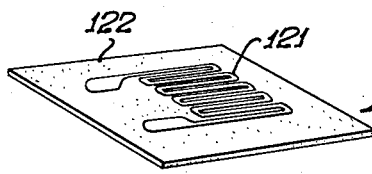
HOWARD GONG,
JOSEPH C. SANCHEZ,
ROBERT E. TALMO,
INVENTORS.
BY THEIR ATTORNEYS.
Spensley & Horn

United States Patent Office 3,089,108
Patented May 7, 1963

3,089,108
SEMICONDUCTOR STRAIN GAUGE
Howard Gong, Monterey Park, and Joseph Sanchez and Robert E. Talmo, Pasadena, Calif., assignors to Electro Optical Systems, Inc., Pasadena, Calif., a corporation of California
Continuation of abandoned application Ser. No. 60,041, Oct. 3, 1960. This application Sept. 5, 1962, Ser. No. 222,765
6 Claims. (Cl. 338—2)

This invention relates to strain-electrical translating elements and methods for producing the same. This application is a continuation of previously filed and copending application Serial No. 60,041 entitled "Semiconductor Strain Gauge" filed October 3, 1960, now abandoned.

The present invention device further relates to and may be employed in producing various types of transducers such as motion sensing devices, accelerometers and other instruments for measuring movement, forces and pressures. Strain gauge elements are employed in two basic configurations; bonded and unbonded. The present invention is applicable to both.

Prior art strain gauges of the unbonded type typically include a strain sensitive metal wire translating element connected to two supports which are subject to tension under an applied force, the magnitude of which is to be determined. When subjected to tension, the wire changes in dimension and electrical resistivity, and therefore in overall resistance. It is this change in resistance which is measured, for example, by a well known Wheatstone bridge. The name given to a change in resistivity caused by applied stress is the piezoresistance effect. This effect is particularly pronounced for certain semiconductor materials which are particularly well suited for the present invention.

The term semiconductor material as used in the present invention includes silicon, germanium, silicon-germanium alloys and silicon carbide.

A thin rod or bar of any material exhibiting a sufficient piezoresistance effect can be used in a manner similar to that of the well known prior art wire strain gauges. Young's modulus E relates the change in stress to the strain by the equation $$E = \frac{S}{\epsilon}$$

where S represents stress and $\epsilon$ represents strain. In a crystalline material such as silicon, E varies with direction. $\epsilon$, in the above equation, is the longitudinal strain resulting from simple longitudinal stress S, assuming no stress in the transverse direction. The fractional change in resistivity due to a stress S is $$\frac{\Delta \rho}{\rho} = \pi S$$

where $\pi$ is the longitudinal piezoresistance coefficient and where $\rho$ represents the electrical resistivity of the material. Thus, $$\frac{\Delta \rho}{\rho} = \pi \epsilon E$$

This can be written as ME, where M is defined as $\pi E$.

Since the electrical resistance R of any material $= \rho L/A$, where R is the resistance of a rod, $\rho$, the resistivity, L its length and A its cross-sectional area, it can be shown, for a simple case that $$\frac{\Delta R}{R} = (1 + 2\delta + M)$$

$\delta$ denotes Poisson's ratio; i.e., the ratio of the magnitude of transverse strain to longitudinal strain resulting from the postulated simple stress S. In the above equation, the first term on the right expresses the resistance change due to change in length; the second term is due to the change in area; and the third term is due to the resistivity change. The factor $$K = \frac{\Delta R}{R \epsilon} = 1 + 2\delta + M$$

is called the gauge factor. Most of the commonly used wire strain gauges have a gauge factor of between 2 and 4. P type silicon has a gauge factor along the [111] crystallographic direction from 70 to 200. Likewise, N type silicon has a comparable gauge factor along the [100] crystallographic direction. Germanium also exhibits a high gauge factor, dependent upon crystallographic orientation and conductivity type. Thus, there is indicated, an increase in sensitivity of up to 100 to 1 over presently used strain gauge materials. The strain gauge of the present invention advantageously employs this phenomenon.

Prior art metallic strain gauges which are typically in wire form, have a relatively low gauge factor, as indicated above. Further, the output signals produced by such gauges and the signal-to-noise ratio are both relatively low. Additionally, such prior art strain gauges suffer in accuracy from hysteresis due to plastic and metallic flow. The mechanical stability of such wire strain gauge elements is relatively poor and the resistivity low.

While the use of semiconductor material as strain gauge elements has been known to the prior art, such strain gauges have also been subject to disadvantages. Prior art semiconductor strain gauge elements of the unbonded type are non-flexible and are difficult to fabricate and couple to the system wherein strain is to be measured.

In addition, the prior art semiconductor strain gauge elements are inherently weak from a mechanical point of view. The present invention resides, in part, in the recognition of the fact that the mechanical strength of a semiconductor strain gauge can be greatly increased by producing an element whose cross-sectional area is relatively small in relation to its length. In addition, the present invention is directed at a method for fabricating such a strain gauge element.

The present invention is predicated to a large extent upon the discovery that a unitary semiconductor crystal body of a predetermined conductivity type and orientation can be provided having extreme mechanical flexibility when the body dimensions are regulated so that the ratio of the length to the smallest cross-sectional dimension is from around 50 to 1 to 4000 to 1 and wherein the body surfaces are rendered microscopically smooth by subjecting the same to an etch solution or by an electrochemical etching step.

By extreme flexibility is meant that the body may be bent to a substantially small radius of curvature, e.g. from 100 to 200 times its minimum cross-section dimension. For example a radius of curvature of 0.2 inch has been achieved with a body whose minimum cross-sectional dimension was 0.001 inch.

The etch solution required to render the body surfaces microscopically smooth should thus render the surface free from pits, cracks, sharp edges, sharp puncture lines and other discontinuities thereby eliminating areas of possible stress concentration.

In accordance with the presently preferred embodiment of the present invention, there is produced a silicon strain gauge element generally shaped in the form of a filamentary or elongate member with enlarged end portions. The cross-sectional configuration of the thin elongate portion thereof assumes the shape of a circle, ellipse or rectangle with rounded corners. The smallest dimension across the thin portion should be in the range from 0.00025 to 0.003 inch. A novel method for fabricating the element including the use of an improved silicon etch forms a basic part of the present invention.

Another feature of the present invention involves the provision of a mounted bonded semiconductor strain gauge element of extreme flexibility. This element is shaped much like a thin ribbon. The entire bottom surface of the element is flat and planar. The upper surface can also be flat and planar or can assume a channel shape. This element, properly oriented, as herein explained, is mounted, bottom surface down upon a flexible carrier member by use of a cement or other adhesive material. Connection terminals are provided on the carrier member near the opposite ends of the mounted element for external connection thereto.

It is therefore a primary object of the present invention to provide a flexible semiconductor strain gauge element of improved design which possesses a high gauge factor.

Still another object of the present invention is to provide a mounted bonded semiconductor strain gauge which will measure strain over an extremely small area.

Another object of the present invention is to provide an improved method for producing a semiconductor strain gauge element to close tolerances and of unusually small size.

Yet another object of the present invention is to provide a semiconductor strain gauge element of unusually high strength and capable of withstanding a considerable degree of bending.

A further object of the present invention is to provide a method for producing a strain gauge element of unusual strength in bending and in tension.

A still further object of the present invention is to provide a bondable strain gauge of improved design capable of being bonded to an irregular non-planar surface.

It is yet another object of the present invention to provide a highly sensitive bonded strain gauge element mounted upon a flexible carrier member.

Yet a further object of the present invention is to provide a bondable strain gauge having a relatively high signal to noise ratio.

It is a still further object of the present invention to provide a flexible semiconductor strain gauge substantially free of hysteresis.

A yet further object of the present invention is to provide a compact and highly flexible bonded strain gauge including a carrier member suitable for micro stress measurements.

It is still a further object of the present invention to provide a flexible bonded strain gauge having improved electrical terminals all mounted upon a flexible carrier member.

The novel features which are believed to be characteristic of the present invention, together with further objects and advantages thereof, will be better understood from the following description in which the invention is illustrated by way of example. It is to be expressly understood, however, that the description is for the purpose of illustration only and that the true spirit and scope of the invention is defined by the accompanying claims.

In the drawings:

FIGURE 11 is a view in perspective of the grid of FIGURES 9 and 10 subsequent to an etching operation.

FIGURE 12 is a schematic taken along line 12—12 of FIGURE 11;

FIGURE 13 is a perspective view of an alternative embodiment strain gauge element;

FIGURE 13a is a sectional view taken along line 13a—13a of FIGURE 13;

FIGURE 14 shows a plan view of a bondable strain gauge element in accordance with the present invention which is mounted upon a flexible carrier member including electrical terminals;

FIGURE 15 is a front elevation of the strain gauge of FIGURE 14;

FIGURE 16 is a perspective view of a wire element mounted bondable strain gauge in accordance with the prior art;

FIGURE 17 shows the strain gauge of FIGURES 14 and 15 bonded to the interior of a curved portion of the wing of an airplane in order to measure stress;

FIGURE 18 shows four strain gauge elements in accordance with the FIGURE 7 embodiment used to measure the stress in a beam;

FIGURE 19 is a view in perspective of a single finished strain gauge element similar to that shown in FIGURE 13 wherein the enlarged end portions have been eliminated; and FIGURE 20 shows a strain gauge element constructed in accordance with the present invention bent to an extremely small radius of curvature in order to demonstrate its extreme flexibility.

Figure 7:
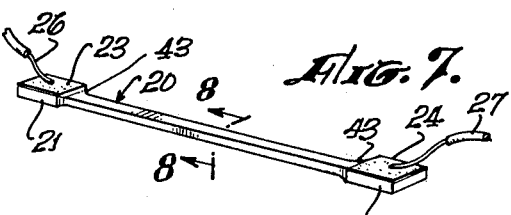
FIGURE 7 is a view in perspective of a single finished strain gauge element in accordance with this invention forming part of the grid.
Figure 8:
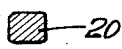
FIGURE 8 is a view taken along line 8—8 of FIGURE 7.
Figure 10:
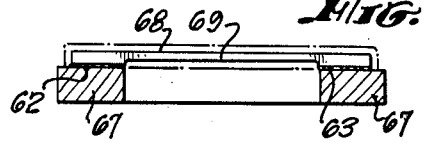
FIGURE 10 is an end view of the grid and jig in FIGURE 9.

Referring now to the drawings, one embodiment of the present invention is shown in FIGURE 7 and includes in general terms, an elongate or filamentary body portion 20 and enlarged end portions 21 and 22. A layer of material is ohmically bonded to a surface of each of the end portions to provide an ohmic, non-rectifying contact region 23 and 24 at each of the end portions 21 and 22 respectively. The element can be formed of various semiconductor materials, however, in the presently preferred embodiment, silicon is utilized due to its high piezoresistance coefficient and its superior temperature characteristics. More particularly, in this embodiment P type silicon with a [111] crystallographic orientation is utilized since it has the highest piezoresistive coefficient. It can be seen that the strain gauge element of the present invention is in effect a filamentary beam with enlarged end portions formed integrally. The enlarged ends preclude a weakened section of the element and provide a relatively large surface area to which a mechanical connection can be made. Additionally, referring particularly to FIGURE 8, it can be seen that the elongate body of the strain gauge element has no sharp corners but is to the contrary, generally square in cross-section but with rounded edges. It should also be noted that the region which the elongate section is expanded into the enlarged end portions is also formed at a radius. Thus, there are no sharp juncture lines or points between the elongate body section and the end portions to cause an area of stress concentration. As an illustration of the size of the present invention strain gauge element to clarify the description and discussion thereof, the overall element is approximately three quarters inch to one inch in length, while the elongate body portion has a thickness, or smallest dimension, of approximately 0.0005 inch. The width of the body along the elongate section is typically 2 to 3 mils and may be as large as 5 to 6 mils. Lead wires 26 and 27 are ohmically affixed to the opposed contact surfaces of the element at the contacting regions 23 and 24, as shown in FIGURE 7. The manner in which the contact regions are formed and leads affixed is discussed hereinafter in connection with the description of the method of forming strain gauge elements in accordance with the present invention.

By forming an element in accordance with the foregoing dimensions there results a beam of great flexibility, i.e., it may be deflected a distance of about 200 times its thickness, for example. A beam formed in accordance with the present invention techniques may be made even more flexible with a minimum of hysteresis so that it may be adapted to many strain applications since the beam can be bent to a very sharp radius and formed to various non-planar configurations. To achieve this extreme flexibility the ratio of length to cross-sectional dimension of the silicon element must lie in the range from 50:1 to 4000:1, the smallest cross-sectional dimension must be from 0.0005 to 0.003 inch, and the surfaces of the element must be of microscopic smoothness, the microscopic smoothness being readily achievable by etching the element as explained hereinbelow.

As an illustration of the extreme element flexibility achievable, in FIGURE 20 of the drawing there is shown a strain gauge element 150, formed in accordance with this invention, bonded to the peripheral surface of a rod 155 to measure the torsional force 156 to which the rod is subjected. The rod 155, in this illustrative example, has a radius of 0.2 inch and the silicon strain gauge element 150 has a length of 0.62 inch and a smallest cross-sectional dimension of 0.001 inch. Various other features of the present invention will become more apparent hereinafter in connection with the discussion of the method of fabrication thereof.

Figure 1:
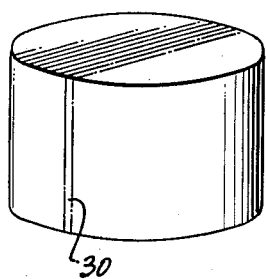
FIGURE 1 is a view in perspective of a grown single crystal of silicon oriented according to the [111] direction preparatory to being sliced to form a generally rectangular wafer.
Figure 4:
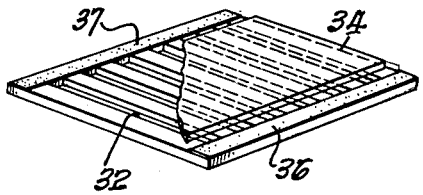
FIGURE 4 is a view corresponding to FIGURE 3 showing an intermediate step of fabrication.
Figure 2:
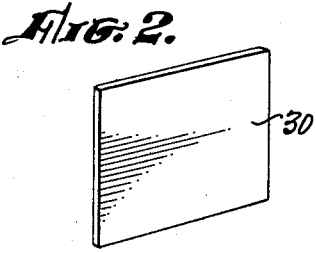
FIGURE 2 is a view in perspective of a silicon wafer cut from the crystal of FIGURE 1.

Referring now to FIGURE 1, there is shown a silicon single crystal body from which a plurality of strain gauge elements are to be formed in accordance with this invention. The silicon crystal is of P type formed for example, by boron doping. The crystal has been grown on a predetermined crystal axis, such as [111] and the resistivity in the illustrative embodiment is approximately 0.1 ohm cm. The silicon of semiconductor grade and is approximately three quarters of an inch to an inch in height, the height of the crystal being greater than the finished desired length of the strain gauge element. The diameter of the crystal is typically 1¼ inches. The crystal is cut by means well known to the art to form a silicon wafer such as shown in FIGURE 2 with a [111] crystallographic orientation. The wafer 30 is approximately 12 to 20 mils in thickness. A typical method for cutting the wafer from the crystal body is by a diamond saw or similar means well known to the art. The wafer 30 is then lapped by methods well known to the art to a desired thickness of, for example, approximately 10 mils.

Figure 5:
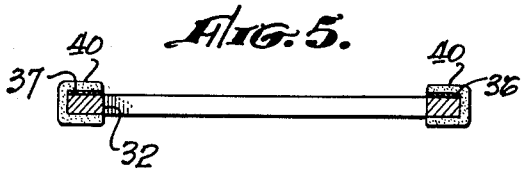
FIGURE 5 is a view in elevation of the grid of FIGURE 4 at a subsequent step of fabrication.
Figure 3:
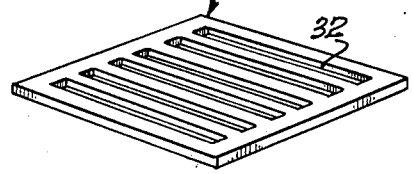
FIGURE 3 is a view in perspective of the wafer of FIGURE 2 formed to a grid.

From the wafer of FIGURE 2 a grid as shown at FIGURE 3 is formed. The grid is formed by cutting slots approximately 10 mils in width at equally spaced intervals along the length of the wafer. The length of the slots is approximately equal to the length of the body portion 20 of the element desired, that is, the length of the element between the opposed end portions. The slots are formed as, for example, by ultrasonic cutting. After the grid 33 as shown in FIGURE 3 is formed, a mask 34 is placed thereover which mask extends across the width of the grid. Its dimension in this direction is somewhat less than that of the length of the slots. Thus, end portions 36 and 37 of the grid 33 are exposed; in addition, a portion of the grid elements extending from both of these end regions are also exposed. A typical length of the slots is 600 mils. In such a case, the comparable dimension for the mask 34 is 560 mils. Thus, the mask 34 falls short of the end regions 36 and 37, and as will hereinafter be explained, serves to define the active length of the element 20 intermediate the enlarged end regions 21 and 22 (see FIGURE 7). The mask may be formed of any suitable material for preventing the deposition of gold onto the areas of the grid covered by the mask. Thus, a thin foil of tantalum may form the mask 34. Gold is then evaporated onto the grid with the mask in place to deposit and ohmically bond the layer of gold upon the exposed surfaces of the grid not covered by the mask. Various means well known to the art may be utilized to form the gold contacting layers 36 and 37, such as for example, evaporation and electroless plating. In the presently preferred embodiment, evaporated gold is alloyed to form a gold-silicon eutectic following evaporation. After the deposition of the gold layers 36 and 37, the mask 34 is removed and the end regions 36 and 37 of the grid are masked. Thus, as shown in FIGURE 5, a layer of wax is formed around the edges of the grid to cover the gold layers 36 and 37 and the undersurface of the grid beneath the gold layers which will form the end portions 21 and 22 of the finished device. Thus, as shown in FIGURE 5, the grid is exposed throughout the body portion thereof with a masking layer 40 surrounding a small portion of the bars including the edge and excluding the elongate portion or active length of the grid.

The grid is then etched to a thickness of, for example, 1 to 3 mils over the active length and leaving approximately 10 mils across the end portions. That is, the intermediate portion of the grid between the masked end portions is reduced in thickness to approximately 1 to 3 mils. In accordance with a presently preferred embodiment of the method of the present invention, the etching is accomplished by utilizing a novel etching solution comprising one part of hydrofluoric acid to 9 parts of nitric acid to which is added 6.7 mg. of mercuric nitrate per cc. of the total of the acids. The mercuric nitrate acts as a moderator to prevent undercutting of the end portions of the device. While the specific combination of acids and mercuric nitrate has been found to be particularly satisfactory, the relative amounts of these constituents, it has been found, may be varied over a range as follows: To one part of hydrofluoric acid there may be added from 8 to 11 parts of nitric acid. In all instances it is assumed that the strength of the respective acids is hydrofluoric acid 48% and nitric acid 70%. The amount of mercuric nitrate may be varied from as little as 4 to as much as 10 mg./cc. of the combined acids. Typically, the acid solution is agitated slightly as thermercuric nitrate is added; all of this taking place at room temperature.

In order to generalize as to the relative amounts of the constituents in the novel etch composition above described, there is listed here below the molar ratios of the acids:

| | Moles/liter |
|---|---|
| Hydrofluoric acid | 0.24 |
| Nitric acid | 0.64 to 0.88 |

Figure 6:
FIGURE 6 is a view in elevation of the grid after etching.

Thus, as shown in FIGURE 6, when the grid is etched, it is required that the juncture area 43 between the body portion 20 and the end portions 21 and 22 be formed at a radius of curvature rather than at a sharp angle to avoid the formation of an area of high stress concentration. It has been found that the use of the moderator (mercuric nitrate) in the etch together with the particular composiion indicated prevents such undercutting or formation of sharp edges. In the presently preferred method the etching step utilizing the above described etch is preferably carried out over a period of time as, for example, seven minutes and the etch is agitated during the etching period. Other times may be used depending upon the amount of material to be removed. When the etching occurs, the thickness of the body portion 20 is reduced to approximately 1 to 3 mils and it can be seen that during the etch, the edges of the body adjacent the slots 32 will be rounded off by the action of the etch. The contact leads 26 and 27 are then affixed to the contact surfaces 21 and 22 respectively by various means known to the art. In the present fabrication method, an alloyed thermo-compression bond using boron doped gold leads is employed. For example, the equipment utilized is a Nichrome strip heater, a Variac to control the current in the strip, and a thermocouple attached to the strip to determine its temperature. The planar surface of the end portions 21 and 22 is particularly adapted to formation of the lead contacts 26 and 27 by this method. Although a gold-silicon eutectic forms at 370° C., it has been found that a suitable temperature for formation of the bond between the contact leads 26 and 27 and the contact areas 23 and 24, together with the bond between the areas 23 and 24 and the end portions of the body, is of the order of 550° C. to 600° C. The enlarged ends thus preclude a weakened section of the element due to the gold-silicon eutectic which is somewhat brittle. Contacts made by this process are characterized by high mechanical strength, low resistance, non-rectification and consistency over a large temperature range.

The wax mask 40 is removed to obtain a configuration as shown in FIGURE 6. A second etching step may then be carried out to trim the body portion of the device to the final desired resistance on each separate element. The desired resistance is achieved by measuring the resistance of the entire body. If it is too low, the body is again immersed into the etch until the overall resistance is increased to the desired value.

Thus, a finished semiconductor strain gauge element as shown in FIGURE 7 and previously described, is obtained by the steps of the method described hereinabove. Such an element wherein a generally elongate body is formed integrally with end portions of substantially greater cross-sectional configuration possesses a number of superior qualities for use in transducers. Such qualities include a high gauge factor wherein the value of the gauge factor of devices in accordance with the present invention are as high as 200 compared to 2 for most wire types. Such devices possess exceptionally low impedance and can be made in a range of resistance from less than 100 ohms to well over 10,000 ohms. Such devices are susceptible to fabrication in minute size since a diameter as small as 0.00025 inch and a length of 0.75 inch can be obtained. Geometry of this magnitude allows the design of sub-miniature transducers and insures high natural frequency resulting in less susceptibility to shock and vibration damage unlike prior art semiconductor strain gauge devices.

Referring now to FIGURES 9 through 13a, another alternative embodiment of the present invention is shown. This element, while similar to that of FIGURE 7, includes enlarged end sections with the enlargement to one side only of the body section. That is, referring to FIGURES 13 and 13a, it can be seen that in the alternative embodiment, the entire lower surface of the strain gauge element is substantially planar and that the increased depth of the enlarged end sections occurs above the upper surface 50a of the body portion only. Thus, as shown in FIGURES 12 and 13, the alternative embodiment comprises a body section 50 with enlarged end portions 51 and 52. The lower surface 50b of the body portion 50 and the end portions 51 and 52 lie in a single plane, such that the entire element is planar on one surface. Such a device can be fabricated by steps similar to those discussed hereinbefore.

Thus, a wafer 60 formed as previously described to a thickness of from 12 to 20 mils is provided by sawing from a single crystal oriented along the 111 axis.

Figure 9:
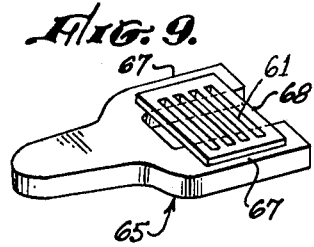
FIGURE 9 is a view in perspective of another grid after mounting upon a jig in accordance with an alternate embodiment of this invention to produce a strain gauge of a different design.

This wafer is then lapped to a thickness of from 4 to 6 mils. The flat wafer is then placed into an etch solution consisting of a combination of the following acids: 1 part hydrofluoric acid, 3 parts $HNO_3$ and 1 part HAC. The wafer is thus reduced to an overall thickness of approximately 3 mils. A series of parallel grooves or slots approximately 20 mils wide are then cut through the wafer 60 as shown in FIGURE 9. In this embodiment the distance between the slots is also approximately 20 mils. As before, the grooves may be produced by an ultrasonic cutting apparatus.

The entire wafer 60 including the slots 61 is then mounted and fixedly bonded by means of an acid resistant wax at 62 and 63 (see FIGURE 10) to a generally fork shaped stainless steel jig 65. It will be seen from FIGURE 9 that the jig is of a width somewhat greater than that of the wafer 60.

There are thus left exposed two parallel strips 67 parallel to and adjacent the edges of the wafer, with the wafer 60 affixed to the jig 65. Thus, all of the upper surface of the entire wafer and jig combination is immersed into a second etch solution for approximately one minute. Thus, the entire upper surface 68 is exposed to the acid.

In addition, that portion of the lower surface 69 (see FIGURE 10) which is not covered by wax and which rests above the opening in the jig is exposed to the etch solution. Thus, the etch will cut away that portion of the wafer 60 indicated by the phantom line in FIGURE 10. There will thus remain a differently shaped wafer in which one surface is planar and the other hollowed or channel shaped. The entire wafer is now removed from the etch and rinsed in deionized water. Thereafter, the individual elements are separated from the grid and contact leads 80 and 81 are attached to the upper surface of the mesa end regions 51 and 52.

As with the previously described embodiment all of the surfaces and edges of this element as may be seen in FIGURE 13 are rounded. The contacts may be produced by the method as was described in connection with the embodiment of FIGURE 7. That is, the filamentary bar is placed upon a Nichrome resistance strip heater. A short length of thin gold wire is then placed upon the upper surface of regions 51 and 52 and pressure is brought to bear on the wire of a force of approximately 5000–10,000 p.s.i. while the heater is energized to heat the bar to a temperature sufficient to cause alloying of the gold with the silicon. Alternatively, the contact may be produced by alloying a layer of gold on the upper surface of regions 51 and 52 by heating to the eutectic of gold silicon. This procedure, if followed, is carried out before ultrasonic cutting.

In FIGURES 17 and 18 there are shown two applications of the strain gauge elements of the present invention. Four strain gauge elements 20 of the unbonded type as shown in FIGURE 7 are joined to two vertical opposed members 90 and 91 which are secured to a generally horizontal disposed horizontal beam 92 extending through these members. Thus, any strain induced in the beam 92 will produce an appropriate signal representative thereof across the leads associated with the filamentary unbonded strain gauge elements 20. The leads may be connected in a well known arrangement to produce the desired output signal.

In FIGURE 17, a single bonded strain gauge element in accordance with the embodiment of FIGURE 13 affixed to the inner surface of a curved portion of an airplane wing 100 in order to measure any strain which might be induced therein during a load test, for example, the extreme flexibility of the present invention filamentary strain gauge element, permits its use in measuring strain over irregular non-planar surfaces. The strain gauge element of the present invention is flexible and strong to such an extent that it may be bent more than 180° without breaking with a radius of bending of as little as 1/8″. Thus, the element of the present invention may even be bent over itself over an angle well in excess of 180° without breaking.

Another alternative embodiment of the present invention is illustrated in FIGURES 14 and 15 and is an improved semiconductor strain gauge element, indicated generally by the reference numeral 110, which is secured to a flexible mounting member 111. A pair of improved electrical terminals 112 and 113 are secured to the flexible member 111 at either end of the semiconductor strain gauge element 110.

The strain gauge element 110 is fabricated from a unitary single crystal of properly oriented semiconductor material; the single crystal structure serving to eliminate hysteresis while providing optimum flexibility. The element 110 is again of a thin elongate shape and has a pair of opposed end sections 114 and 115 separated by an even thinner intermediate section 116. Therefore, the cross-sectional area of each of the end sections 114 and 115 is substantially greater than the cross-sectional area of the intermediate section 116. The structural advantages, together with methods for producing the same, are clearly pointed out hereinbefore.

In the alternative embodiment of FIGURES 14 and 15 the mounting member 111 consists of a sheet of glass or mica paper impregnated with a suitable adhesive such as epoxy, phenolic, or ceramic adhesives. The sheet thickness is preferably from 0.0005 to 0.002 inch. Alternatively, the mounting member 111 may be fabricated of a metallic sheet such as stainless steel, to thereby provide the additional advantage of being able to join the members to test parts. The strain gauge element 110 is attached to the mounting member 111 by an adhesive bonding process using epoxy adhesives, the epoxy providing electrical insulation therebetween if necessary.

The electrical terminals 112 and 113 are tabs of silver, gold or copper and are attached to the mounting member 111 with the same adhesive used to bond the strain gauge element 110 to the mounting member 111. These tabs have a hole in the center, as shown in FIGURE 14, to reduce heat transfer between tab ends to impede melting of solder at one end while electrical leads are being attached at the other. An intermediate lead 116 connects end section 114 of the strain gauge element 110 to one end of the terminal 112 while a similar intermediate electrical lead 117 connects the other end 115 of the strain gauge element 110 to one end of the electrical terminal 113. The other end of the electrical terminals 112 and 113 are tinned for the connection thereto of external electrical leads 118 and 119 respectively. An alternative embodiment involves the use of printed circuit techniques whereby a copper sheet is bonded to one surface of the mounting members 111 and all of the copper except the tab areas of terminals 112 and 113 etched away.

The foregoing construction results in an extremely flexible strain gauge device conformable to extremely small radii of curvature. In FIGURE 17 there is shown an application for such a device to measure micro stresses in a model of an air foil. The device of the present invention is extremely compact, as can be seen by comparison to a typical prior art metallic strain gauge, as illustrated in FIGURE 16, which is drawn to a much different scale than the illustrations of FIGURES 14 and 15.

In the prior art device of FIGURE 16, a metallic wire filament 121 is secured to a flexible mounting card 122. As explained hereinabove, the length of the wire filament 121 must be relatively long in order to achieve some useful degree of device sensitivity. Such a filament, in its most compact form is about 9/16 inch square, excluding the connecting tabs.

In FIGURE 19 there is shown a simplified version of a silicon strain gauge element 130 in accordance with the present invention. As is the case with all semiconductor strain gauge elements, in accordance with this invention, it is made of single crystal semiconductor material. This particular example in a preferred example is in the form of a flat ribbon 6 mils wide, ½ mil thick and ¼ inch long. It is boron doped P-type silicon of a resistivity of 0.017 ohm cms. and is oriented in the [111] direction to obtain the maximum gauge factor.

In manufacture it will first be reduced to a thickness of approximately 0.8 mil by a typical semiconductor etch such as 1 part HF, 6 parts HNO, and 3 parts HAC after cutting as explained before. Subsequently, a trim etch including 1 part HF to 9 parts $HNO_3$ to which has been added a moderator such as mercuric nitrate used to reduce the thickness (which is a critical dimension) to 0.5 mil. The trim etch is made up by adding 2–3 grams of mercuric nitrate to 500 cc. of the acid combination. Other moderators, in similar amounts may be substituted for the mercuric nitrate, such as silver nitrate or selenium nitrate.

This trim etch operation results in the establishment of a surface on the gauge element which is of microscopic smoothness thus rendering the element extremely flexible relative to any other known semiconductor strain gauge element. By microscopic smoothness it is herein meant that stress raises do not lower the strength and flexibility by propagation of surface imperfections such as cracks, pits, scratches or other deviations from a smooth surface of a size greater than 0.25 micron.

It should be pointed out that semiconductor strain gauge elements in accordance with the present invention need not necessarily be aligned with the unitary crystal oriented in line with the crystallographic direction necessary to achieve the highest gauge factor. For example, with a P-type single silicon crystal of [111] orientation, a gauge factor of as high as 200 may be achieved. As the [200] orientation is approached the gauge factor may be as little as 75 to 100 with gauge factors intermediate these when the single crystal is at an intermediate orientation relative to its length. For N-type silicon the maximum gauge factor occurs when the single crystal is oriented along the [100] direction. The orientation required for maximum or intermediate gauge factors for germanium or other semiconductor materials herein specified may easily be determined by one skilled in the art. A semiconductor strain gauge in accordance with this invention, as compared to metallic wire filaments can also be made much smaller. The thickness may be as little as 0.00025 inch and a length as small as ¼″ while passing a sensitivity of from 75 to 100 times that of the prior art device as shown in FIGURE 19, for example. By providing gauge elements of single semiconductor crystal material, of either N or P type of a thickness from 0.00025 to 0.003 inch and a smallest cross-sectional dimension compared to length of 1:50 to 1:4000 one is able to design sub-miniature transducers using high resistance to shock and vibration damage.

There has thus been described a new and improved semiconductor strain gauge element and method for fabricating the same. A most important feature of this invention is the provision of a thin elongate filamentary flexible semiconductor element. Where it is necessary to produce ohmic electrical contacts the provision of enlarged ends as herein described is helpful. Ordinarily, the gold-silicon eutectic forms a rather brittle alloy. Therefore, an enlarged end region which is joined to a thin flexible region permits the improved performance. Alternatively plated end contacts can also be used.

Although the present invention has been described with a certain degree of particularity, it is understood that the present disclosure has been made only by way of example and that numerous changes in the details of construction and the combination and arrangement of parts may be resorted to without departing from the spirit and scope of the invention.

What is claimed as new is:

1. A strain gauge comprising an elongate unitary single semiconductor crystal body, said body being of either P or N type conductivity of a predetermined crystallographic orientation, said crystal body being a flexible beam having its surface etched to microscopic smoothness, said beam having a length to smallest cross-sectional dimension ratio in the range from about 50:1 to about 4000:1 to render said beam flexible, said smallest cross-sectional dimension being in the range from about 0.00025" to 0.003"; and first and second electrical terminals in low resistance ohmic contact with said body near the ends thereof.

2. A silicon strain gauge comprising: an elongate unitary single silicon semiconductor crystal body of either P or N type conductivity of a predetermined crystallographic orientation, said crystal body being a flexible beam having its surface etched to microscopic smoothness, said beam having its surface etched to microscopic smoothness, said beam having a length to smallest cross-sectional dimension ratio in the range from about 50:1 to about 4000:1 to render said beam flexible; said smallest cross-sectional dimension being in the range from about 0.00025" to 0.003"; and first and second electrical terminals in low resistance ohmic contact with said body near the ends thereof.

3. A silicon strain gauge comprising: an elongate unitary single silicon semiconductor crystal body of P type silicon having a [111] crystallographic orientation, said crystal body being a flexible beam having its surface etched to microscopic smoothness, said beam having a length to smallest cross-sectional dimension ratio in the range from about 50:1 to about 4000:1 to render said beam flexible; said smallest cross-sectional dimension being in the range from about 0.00025" to 0.003"; and first and second electrical terminals in low resistance ohmic contact with said body near the ends thereof.

4. A silicon strain gauge comprising: an elongate unitary single silicon semiconductor crystal body of N type silicon having a [100] crystallographic orientation, said crystal body being a flexible beam having its surface etched to microscopic smoothness, said beam having a length to smallest cross-sectional dimension ratio in the range from about 50:1 to about 4000:1 to render said beam flexible; said smallest cross-sectional dimension being in the range from about 0.00025" to 0.003"; and first and second electrical terminals in low resistance ohmic contact with said body near the ends thereof.

5. A semiconductor strain gauge comprising: a single crystal body of semiconductor material of a predetermined crystallographic orientation, and of a predetermined conductivity and resistivity, said crystal body defining first and second end sections and a flexible elongate intermediate section, said intermediate section having microscopic smooth surfaces and a length to smallest cross-sectional dimension ratio within the range from about 50:1 to about 4000:1, said smallest cross-sectional dimension being in the range from about 0.00025" to 0.003", the cross-section area of said first and second end sections being substantially greater than the cross-sectional area of said intermediate section; a first electrical terminal in low resistance ohmic contact with said first end section of said crystal body; and a second electrical terminal in low resistance ohmic contact with said second end section of said crystal body.

6. A bondable semiconductor strain gauge comprising: a mounting member consisting of a sheet of bondable, flexible materials; first and second electrical terminals bonded to said mounting member in spaced relationship; a unitary single crystal body of semiconductor material of predetermined crystallographic orientation and of predetermined conductivity and resistivity, said crystal body being a flexible beam having its surface etched to microscopic smoothness, said beam having a length to smallest cross-sectional dimension ratio in the range from about 50:1 to about 4000:1 to render said beam flexible, said smallest cross-sectional dimension being in the range from about 0.00025" to 0.003", said crystal body being disposed lengthwise on said mounting member between said pair of electrical terminals; a first electrical lead electrically connecting one end of said body to said first electrical terminal; and a second electrical lead electrically connecting said second end of said crystal body to said second electrical terminal.

References Cited in the file of this patent

UNITED STATES PATENTS

| | | |
|---|---|---|
| 2,739,882 | Ellis | Mar. 27, 1956 |
| 2,827,367 | Cox | Mar. 18, 1958 |
| 3,031,634 | Vogt | Apr. 24, 1962 |
| 3,049,685 | Wright | Aug. 14, 1962 |
| 3,060,395 | Sandvin | Oct. 23, 1962 |